Figure 1:
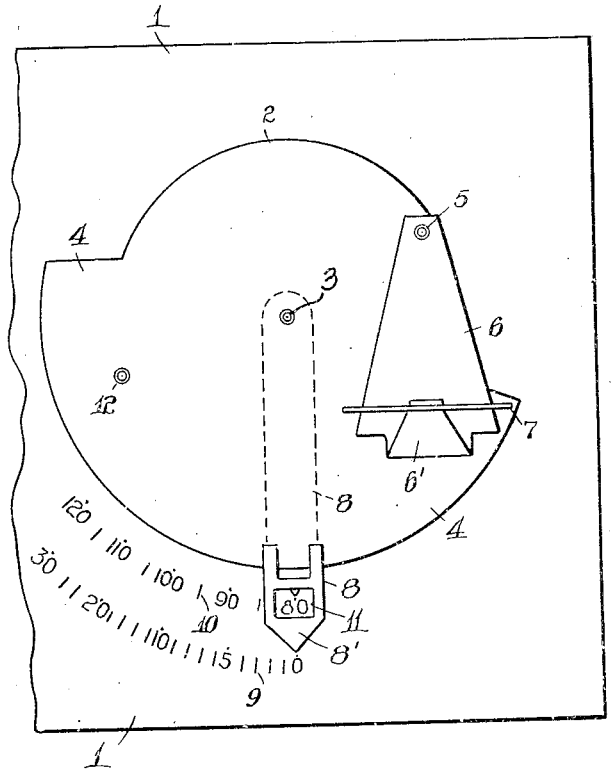

Nov. 8, 1949   F. GRIESE   2,487,539

LETTER SCALE

Filed Oct. 17, 1946

FRANZ GRIESE
INVENTOR

BY
his ATTORNEY

Patented Nov. 8, 1949

2,487,539

UNITED STATES PATENT OFFICE 2,487,539

LETTER SCALE

Franz Griese, Buenos Aires, Argentina

Application October 17, 1946, Serial No. 703,869
In Argentina May 22, 1946

1 Claim. (Cl. 265—61)

The present invention relates to a letter-scale and has for its principal object to provide a novel device of the class mentioned, which shall offer a number of advantages as compared with known constructions, without detriment to the accuracy of the novel device. The letter-scale of the present invention is of simple construction and highly practical in use, since it may be employed both as a wall type and as a table type device.

The letter-scale of the present invention comprises a main support in which a movable disc is secured by suitable means, said disc having a peripherally disposed, projecting sector member concentric therewith, and extending over a limited arcuate portion of the circumference, and at a point in proximity to the remainder of the circumference, there is pivoted to the disc a letter-holder, the disc being likewise provided with a displaceable indicator projecting beyond said sector and adapted to cooperate with one or more graduated scales marked on or applied to the principal support.

Other features and advantages of the present invention will become more clearly apparent in the course of the following detailed description of a preferred embodiment thereof, in which reference is made to the accompanying drawings.

Figure 2:
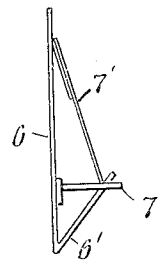

In the drawings:

Fig. 1 is a front elevation of a letter-scale according to the present invention, and Fig. 2 is a side view of the letter-holder forming part of the letter-scale of Fig. 1.

Referring to the drawing, it will be seen that the novel letter-scale of the present invention comprises a supporting plate 1 on which is disposed a rotary disc 2, of cardboard or any other suitable material, said disc being secured to the support by a pivot member, for example a tubular rivet, 3. Over a limited portion of the periphery of the disc, I provide a concentric projecting sector 4 which acts as a counterweight for the letter-holder. At a convenient point near the periphery of the disc in that portion of the circumference not occupied by the sector 4, there is swingingly mounted a letter-holder 6 which comprises a base of sheet material the lower portion 6' of which is bent upwardly at an angle and supports a plate 7 on which a letter 7' which is to be weighed, may be rested (Fig. 2).

On the rear face of the disc 2, there is a displaceable finger or pointer 8 which is secured by the pivot 3, and extends beyond the circumference of the sector 4, the free end of the pointer terminating in an arrow-head 8'. The arrowhead 8' serves to indicate the weight of the letter positioned in the plate 7 of the letter-holder 6, for which purpose it cooperates with a graduated scale 9 marked on or applied to the supporting plate 1.

In order to allow letters to be weighed the weight of which exceeds the range of the scale 9, a second graduated scale 10 is provided between the scale 9 and the periphery of the sector 4, and is adapted to have its values read through a window 11 formed in the arrow-head 8' of the pointer 8. When it is desired to use the higher value scale, a compensating weight (not shown) may be hung from a hook or pin 12 provided in the upper portion of the sector 4.

As will readily be understood, the displaceable pointer 8 will have to be adjusted to zero before effecting such weighing. Moreover such adjustment of the pointer may always be made, also when using the lower range scale, so that accuracy is practically assured whenever the letter-scale is used.

Although in the foregoing I have described my novel letter-scale with particular reference to a preferred embodiment, it is to be understood that I do not intend to be limited thereby but may make sundry modifications as regards construction and details without thereby departing from the spirit and scope of the present invention.

I claim:

A letter-scale comprising a main supporting member, a rotable disc pivoted to said supporting member, said disc having an integral sector-like part extending beyond the periphery and over a portion thereof, a letter-holder pivoted to the disc at a point opposite the sector, a displaceable pointer member projecting radially beyond said sector, a first graduated scale disposed on the main supporting member in the path of said pointer, a second graduated scale disposed on the main supporting member in the path of the pointer and between the first graduated scale and the periphery of said sector, a window in said pointer whereby the graduations of said second scale may be observed and a support on said disc for removably sustaining a compensating weight, whereby the letter-scale may be adjusted to operate selectively with respect to one of said scales.

FRANZ GRIESE.

REFERENCES CITED

The following references are of record in the file of this patent.

UNITED STATES PATENTS

| Number | Name | Date |
|---|---|---|
| 822,804 | Willis | June 5, 1906 |
| 929,200 | Emans | July 27, 1909 |
| 1,486,054 | Stevenson | Mar. 4, 1924 |
| 1,625,799 | Durand | Apr. 26, 1927 |
| 2,022,753 | Woodward | Dec. 3, 1935 |
| 2,308,044 | Brown et al. | Jan. 12, 1943 |

FOREIGN PATENTS

| Number | Country | Date |
|---|---|---|
| 17,126 | Great Britain | Aug. 17, 1916 |